June 15, 1926.
W. J. ROTH
1,588,809
DIRIGIBLE HEADLIGHT
Filed June 4, 1925
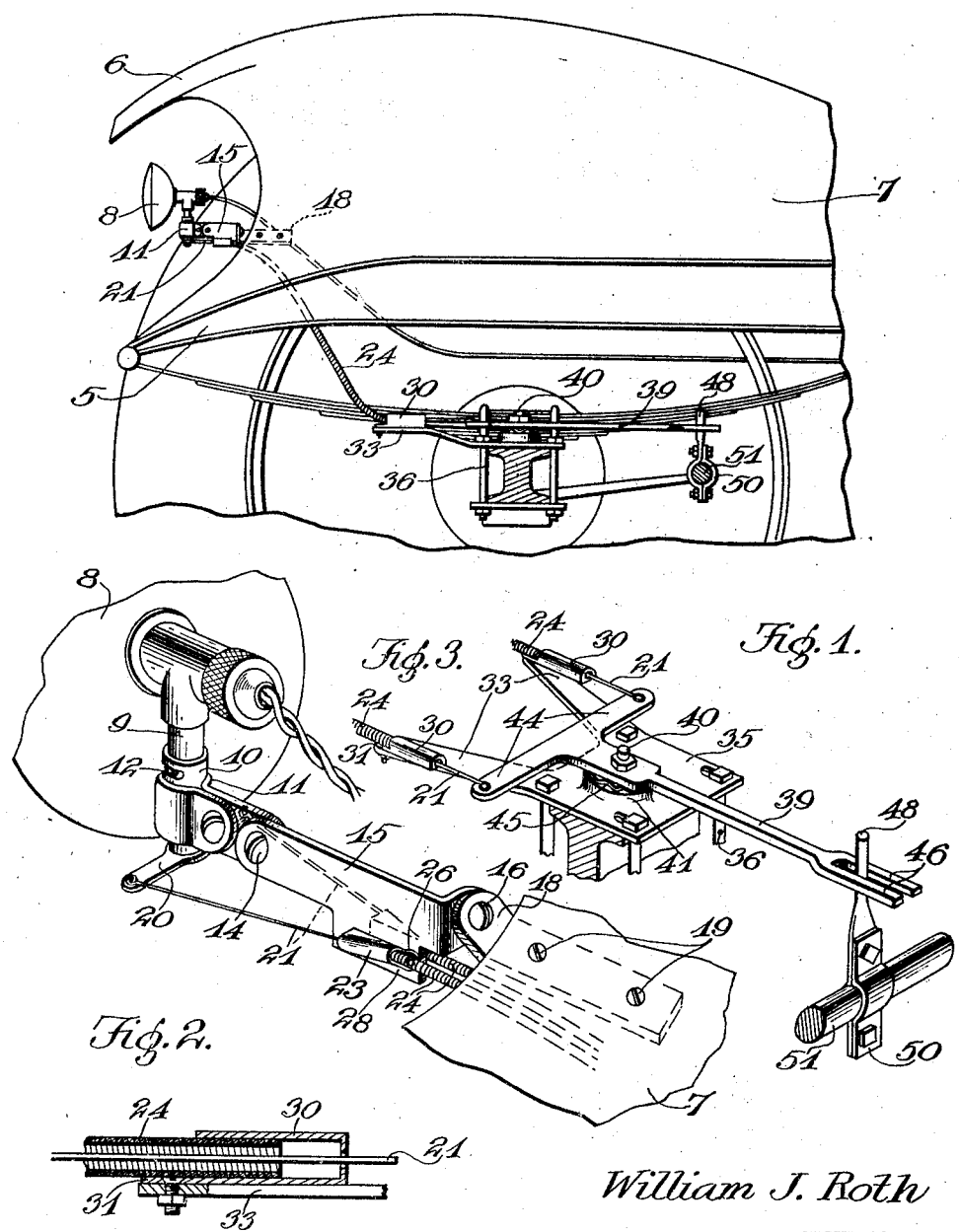
William J. Roth
INVENTOR Patented June 15, 1926.

1,588,809

UNITED STATES PATENT OFFICE.

WILLIAM J. ROTH, OF CHICAGO, ILLINOIS.

DIRIGIBLE HEADLIGHT.

Application filed June 4, 1925. Serial No. 34,934.

This invention relates to dirigible headlights especially adapted for use on automobiles, although not necessarily restricted to such use.

Briefly stated, an important object of this invention is to provide a dirigible light having simple means whereby the same may be applied to an automobile fender or other place on an automobile without marring the appearance of the machine and without elaborately changing the construction of the same.

A further object of the invention is to provide a dirigible light for automobiles having simple means whereby the same may be connected to the transversely extending rod of a steering mechanism whereby the operation of the steering mechanism will cause the headlights to turn simultaneously with the turning of the wheels to the right or the left to bring about the illumination of the roadway directly in advance of the automobile when making a turn.

A further object is to provide a dirigible light of the character specified which is of highly simplified construction, durable in use, and cheap to manufacture.

Other objects and advantages will be apparent during the course of the following description.

In the accompanying drawing forming a part of this application and in which like numerals are employed to designate like parts throughout the same, Figure 1 is a side elevation of the improved dirigible headlight applied, the vehicle being shown partly in section;

Fig. 2 is a fragmentary perspective illustrating the dirigible light and the attaching means therefor;

Fig. 3 is a fragmentary perspective illustrating the operating mechanism for the light;

Fig. 4 is a detail sectional view through a flexible conduit and associated means embodied in the invention.

In the drawing, wherein for the purpose of illustration is shown a preferred embodiment of the invention, the numeral 5 generally designates an automobile of any construction and having a fender 6 provided with an apron or skirt 7 to which the improved dirigible headlight or auxiliary light is attached by a means to be described.

The auxiliary or spotlight 8 is provided with a post 9 rotatably extended through a sleeve 10, the said sleeve being supported by a clamp 11. Fig. 2 illustrates that a pin 12 is extended through a slot in the sleeve 10 and guides and limits the turning of the post 9 and the light 8.

Fig. 2 further illustrates that the clamp 11 is swivelly connected as indicated at 14 to an arm 15. By an adjustment of the swivel member 14 which is in the nature of a screw bolt or the like the light 8 may be adjusted about a horizontal axis. The rear portion of the arm 15 is extended laterally and is swivelly connected as indicated at 16 to a bracket 18, the bracket being securely connected as indicated at 19 to the apron 7 of one of the fenders. Attention is directed to the fact that the swivel member 16 provides a means whereby the light 8 may be positioned to project the light beams in the desired direction. The swivel members 14 and 16 also provide a means whereby the spotlight 8 and associated parts may be adapted to the particular make of motor vehicle to which the light is applied.

The lower portion of the post 9 has rigid connection with cross arms 20, the terminal portions of which have connection with flexible members or rods 21. The flexible members 21 are extended through the rigid guide sleeves 23 of flexible conduits 24.

Each rigid guide sleeve 23 is provided with an apertured ear 26 which is swiveled to a pendent 28 on the lower portion of the arm 15.

Attention is directed to Fig. 3 which illustrates that the rear portions of the flexible conduits 24 have connection with rigid guide sleeves 30 having ears 31 which are pivoted or swiveled to the forward portions of legs 33 of a bracket 35. In carrying out the invention the bracket 35 is secured by bolts 36 or other suitable means to the axle 37 of the vehicle.

Fig. 3 plainly illustrates that a T-shaped member 39 is swiveled as indicated at 40 to a boss 41 on the upper side of the bracket 35 and is provided at the forward end thereof with lateral branches 44 to which the rear portions of the wires 21 are connected. At this point it might be stated that between the member 39 and the upper surface of the boss 41 is preferably provided a radially corrugated washer 45 by means of which frictional contact between the T-shaped member 39 and the boss is reduced to a minimum.

The rear portion of the T-shaped member 39 is bifurcated as indicated at 46 and the slot formed by the bifurcation receives the finger 48 of an actuating member generally designated by the numeral 50 and being in the nature of a two-part clamp which is attached to the cross rod 51 of the steering mechanism.

In the operation of the invention the movement of the rod 51 transversely of the automobile results in the swinging or turning of the T-shaped member 39 with the result that the somewhat flexible rods 21 which pass through the conduits 24 are moved lengthwise to bring about the turning of the spotlight. It will be seen that the spotlight or auxiliary light 8 will follow closely the turning of the wheels either to the right or the left so that the roadway immediately in advance of the vehicle when making a turn will be properly illuminated.

With reference to the foregoing description taken in connection with the accompanying drawing it will be seen that a dirigible headlight or auxiliary light constructed in accordance with this invention may be easily applied to any standard automobile without changing the construction of the same and without altering the appearance of the vehicle. Furthermore, the use of the improved light will not interfere with the steering mechanism or be likely to cause an accident. In fact the use of the improved dirigible headlight greatly increases the safety of motoring as it provides proper illumination directly in advance of the automobile when making a turn, be the turn sharp or otherwise.

The device may be supplied without a spotlight in cases where the vehicle owner already has a spotlight of standard make. In such an event the windshield clamp of the old spotlight may be secured to the port 9 of the novel appliance.

Having thus described the invention, what is claimed is:

1. A dirigible headlight comprising a bracket having means whereby the same may be secured to an automobile, an arm swiveled to the bracket, a clamp swiveled to the arm, a sleeve carried by the clamp, a light having a post extending through the sleeve, means associated with the post and the sleeve to limit the turning of the post, a cross-head connected to the lower portion of the post, and flexible operating wires connected to the cross-head.

2. A dirigible headlight comprising a bracket having means whereby the same may be secured to an automobile, an arm swiveled to the bracket, a clamp swiveled to the arm, a sleeve carried by the clamp, a light having a post extending through the sleeve, means associated with the post and the sleeve to limit the turning of the post, a cross-head connected to the post, flexible wires connected to the cross-head, flexible conduits receiving said wires and having their forward portions provided with rigid sleeve-like attaching members swiveled to said arm, and operating means connected to said wires.

3. A dirigible headlight comprising a bracket having means whereby the same may be secured to an automobile, an arm swiveled to the bracket, a clamp swiveled to the arm, a sleeve carried by the clamp, a light having a post extending through the sleeve, a cross-head connected to the lower portion of the post, flexible wires connected to the cross-head, flexible conduits receiving said wires and provided with rigid sleeve-like attaching members swiveled to said arm, the rear portions of said flexible conduits being provided with rigid attaching sleeves, and a bracket having means whereby the same may be connected to the axle of an automobile and having legs to which said second-named sleeves are pivotally connected.

4. A dirigible headlight comprising a bracket having means whereby the same may be secured to an automobile, an arm swiveled to the bracket, a clamp swiveled to the arm, a sleeve carried by the clamp, a light having a post extending through the sleeve, a cross-head connected to the lower portion of the post, flexible wires connected to the cross-head, flexible conduits receiving said wires and having their forward portions provided with rigid sleeve-like attaching members swiveled to said arm, the rear portions of said flexible conduits being provided with rigid attaching sleeves, a bracket having means whereby the same may be connected to the axle of an automobile and having legs to which said second-named sleeves are pivotally connected, and a T-shaped member connected to said bracket and having laterally extending branches connected to the rear portions of said wires.

5. A dirigible headlight comprising a bracket having means whereby the same may be secured to an automobile, an arm swiveled to the bracket, a clamp swiveled to the arm, a sleeve carried by the clamp, a light having a post extending through the sleeve, a cross-head connected to the lower portion of the post, flexible wires connected to the cross-head, flexible conduits receiving said wires and having their forward portions provided with rigid sleeve-like attaching members swiveled to said arm, the rear portions of said flexible conduits being provided with rigid attaching sleeves, a bracket having means whereby the same may be connected to the axle of an automobile and having legs to which said second-named sleeves are pivotally connected, a T-shaped member connected to said bracket and having laterally extending branches connected to the rear portions of said wires, and an actuating member adapted for connection to the transversely extending member of a steering mechanism and having a finger slidably connected to said T-shaped member.

6. A dirigible headlight comprising a bracket having means whereby the same may be secured to an automobile, an arm swiveled to the bracket, a clamp swiveled to the arm, a sleeve carried by the clamp, a light having a post extending through the sleeve, means associated with the post and the sleeve to limit the turning of the post, a cross-head connected to the lower portion of the post, flexible wires connected to the cross-head, flexible conduits receiving said wires and having their forward portions provided with rigid sleeve-like attaching members swiveled to said arm, the rear portions of said flexible conduits being provided with rigid attaching sleeves, a bracket having means whereby the same may be connected to the axle of an automobile and having legs to which said second-named sleeves are pivotally connected, a T-shaped member connected to said bracket and having laterally extending branches connected to the rear portions of said wires, and an actuating member adapted for connection to the transversely extending member of a steering mechanism and having a finger slidably connected to said T-shaped member, said bracket being provided with a boss to which said T-shaped member is swivelly connected.

7. A dirigible light for automobiles comprising a bracket having means whereby the same may be connected to the front axle of an automobile and having a pair of diverging legs, a T-shaped member swiveled to said bracket and having laterally extending branches, flexible wires connected to said branches, flexible conduits having rigid attaching sleeves provided with apertured ears swiveled to said branches, said flexible conduits receiving said wires, and a light having connection with said wires.

8. A dirigible light for automobiles comprising a bracket having means whereby the same may be connected to the front axle of an automobile and having a pair of diverging legs, a T-shaped member swiveled to said bracket and having laterally extending branches, flexible wires connected to said branches, flexible conduits having rigid attaching sleeves provided with apertured ears swiveled to said branches, said flexible conduits receiving said wires, and a light having connection with said wires, said bracket being provided with a boss, the upper surface of which is provided with corrugations engaging the under side of said T-shaped member.

In testimony whereof I affix my signature.

WILLIAM J. ROTH.